C. L. HENDRIX.
COOLER.
APPLICATION FILED JUNE 21, 1910.
987,461.
Patented Mar. 21, 1911.
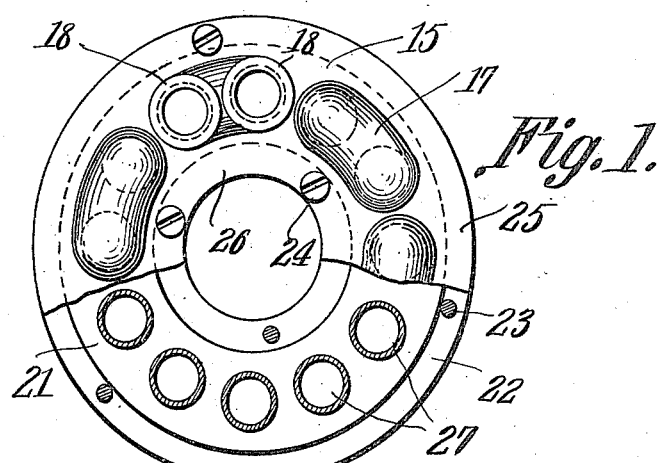
Fig. 1.
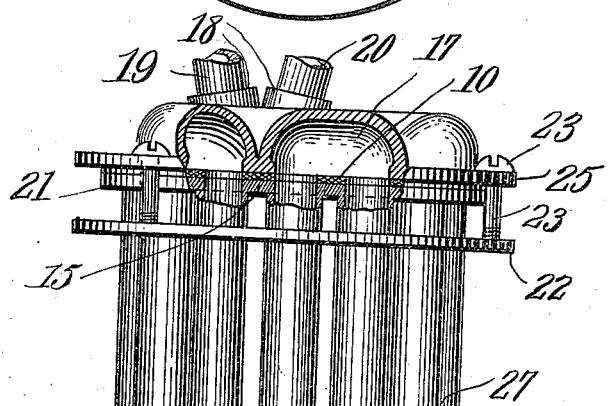
Fig. 2.
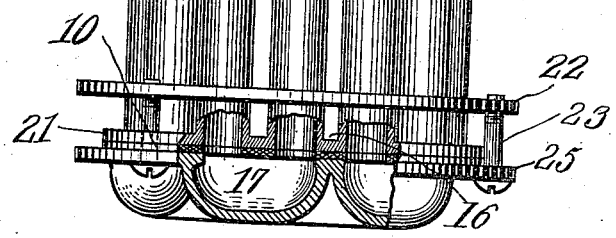
Witnesses
Cherry L. Hendrix, Inventor,
by
Attorneys

UNITED STATES PATENT OFFICE.

CHERRY L. HENDRIX, OF NEW YORK, N. Y., ASSIGNOR TO A. J. BALDWIN, L. C. HOYL, J. D. HENDRIX, AND G. C. CROWELL, ALL OF DAWSON, GEORGIA.

COOLER.

987,461.  Specification of Letters Patent.  Patented Mar. 21, 1911.

Application filed June 21, 1910. Serial No. 568,171.

*To all whom it may concern:*

Be it known that I, CHERRY L. HENDRIX, a citizen of the United States, residing at New York, in the county of New York and State of New York, have invented a new and useful Cooler, of which the following is a specification.

It is the object of this invention to provide a novel means for assembling the pipes of a cooler with the heads thereof, to define a sinuous channel through the cooler.

In the accompanying drawings,—Figure 1 is a top plan of the cooler, parts being broken away; and Fig. 2 is a side elevation of the cooler, parts being broken away.

As shown, the cooler consists of an upper head 15 and a lower head 16, preferably circular in outline, and open in the center. These heads 15 and 16, are chambered at 17, the chambers 17 being located in the arc of a circle. The upper head 15 is provided with nipples 18, located in close relation to each other, and adapted to receive the inlet pipe 19 and the outlet pipe 20.

The tops of the pipes 27 are connected at their ends by integrally formed flanges 21. The pipes 27 are likewise connected, intermediate the flanges 21, by other integrally formed flanges 22. The heads 15 and 16 are provided peripherally, with flanges 25, and likewise provided with flanges 26 prolonged toward the axis of the cooler. The flanges 22 and 25 may be connected by screws 23, located about the periphery of the cooler, the flanges 22 and the flanges 26 being connected by other screws 24, located adjacent the axis of the cooler. A resilient gasket 10 is interposed between the flanges 25 and 26 of the heads, and the flanges 21 whereby the extremities of the pipes 27 are connected. Obviously, by tightening the screws 23 and 24, the ends of the pipes 27 will be held securely in place within the chambers 17, the gaskets 10 being compacted, so that no leakage can result.

By reason of the fact that the screws 23 and 24 unite the flanges 25 and 26 with the auxiliary flanges 22 of the pipes 27, a considerable pressure may be brought to bear, without danger of cracking or injuring the flanges 21 which engage the gaskets 10; it being obvious, that should one of the flanges 22 be cracked, by the tightening of the connecting elements 23 and 24, the flanges 21 will remain intact, the bearing of the said flanges against the resilient gasket 10 being in no wise impaired.

Having thus described the invention, what is claimed is:—

A cooler consisting of a series of pipes disposed in annular relation, there being end flanges formed integrally with the pipes and connecting the pipes at their ends, the end flanges protruding inwardly beyond the pipes toward the axis of the cooler and extending outwardly beyond the pipes at the periphery of the cooler; heads superposed upon the flanges and provided with chambers connecting adjacent pipes to define a sinuous passage through the cooler, the heads being extended toward the axis of the cooler to overlap the inwardly protruding portions of the flanges, the heads being extended outwardly at the periphery of the cooler beyond the outwardly extending portions of the flanges; there being intermediate flanges connecting the pipes, the intermediate flanges being located between the end flanges and being outwardly extended beyond the end flanges; retaining elements uniting the heads and the inwardly protruding portions of the end flanges; and retaining elements located beyond the end flanges and uniting the heads with the intermediate flanges.

In testimony that I claim the foregoing as my own, I have hereto affixed my signature in the presence of two witnesses.

CHERRY L. HENDRIX.

Witnesses:
J. D. HENDRIX,
F. B. OCHSENREITER.

Copies of this patent may be obtained for five cents each, by addressing the "Commissioner of Patents, Washington, D. C."